United States Patent
Kuo et al.

(10) Patent No.: US 9,733,338 B1
(45) Date of Patent: Aug. 15, 2017

(54) SINGLE SATELLITE GEOLOCATION SYSTEMS AND METHODS

(71) Applicant: THE BOEING COMPANY, Seal Beach, CA (US)

(72) Inventors: Lisa Kuo, Palos Verdes, CA (US); Murat E. Veysoglu, Cypress, CA (US)

(73) Assignee: The Boeing Company, Chicago, IL (US)

( * ) Notice: Subject to any disclaimer, the term of this patent is extended or adjusted under 35 U.S.C. 154(b) by 1009 days.

(21) Appl. No.: 13/748,116

(22) Filed: Jan. 23, 2013

Related U.S. Application Data (63) Continuation-in-part of application No. 13/647,093, filed on Oct. 8, 2012.

(51) Int. Cl.
  *G01S 5/12* (2006.01)
  *G01S 3/46* (2006.01)
  *G01S 5/02* (2010.01)

(52) U.S. Cl.
  CPC ...... *G01S 5/12* (2013.01); *G01S 3/46* (2013.01); *G01S 3/465* (2013.01); *G01S 5/0257* (2013.01); *G01S 5/0273* (2013.01)

(58) Field of Classification Search
  CPC ... G01S 5/12; G01S 3/46; G01S 3/465; G01S 3/48; G01S 5/0257; G01S 5/0273
  See application file for complete search history.

(56) References Cited

U.S. PATENT DOCUMENTS

| | | | | |
|---|---|---|---|---|
| 4,160,251 | A * | 7/1979 | Lazarchik | G01K 11/006 342/16 |
| 5,629,707 | A * | 5/1997 | Heuvel | G01S 5/02 342/357.2 |
| 5,844,521 | A | 12/1998 | Stephens et al. | |
| 5,914,687 | A | 6/1999 | Rose | |
| 6,125,260 | A * | 9/2000 | Wiedeman | H04B 7/18532 455/11.1 |
| 6,147,640 | A | 11/2000 | Wachs | |
| 6,184,831 | B1 * | 2/2001 | Dalby | G01S 5/06 342/107 |

(Continued)

FOREIGN PATENT DOCUMENTS

WO 2011160698 A1 12/2011

OTHER PUBLICATIONS

Steffes, Paul G. "Report to GTE SPACENET—Reseasrch and Development of Satellite Interference Location System (SILS) at Georgia TEch." Jun. 1990, pp. 1-237.*

(Continued)

*Primary Examiner* — Gregory C Issing
(74) *Attorney, Agent, or Firm* — Armstrong Teasdale LLP (57) ABSTRACT

A method for locating an interferer is provided. The method includes determining, from one of a time difference of arrival (TDOA) signature and a frequency difference of arrival (FDOA) signature between a first signal received at a satellite at a first location and a second signal received at the same satellite at a second location, a first curve on which the interferer lies, determining, from direction of arrival information generated using signals received from the interferer at a plurality of elements of a linear array on the satellite, a second curve on which the interferer lies, and determining, based on an intersection between the first and second curves, the location of the interferer.

12 Claims, 7 Drawing Sheets

(56) References Cited

U.S. PATENT DOCUMENTS

| | | | |
|---|---|---|---|
| 6,282,179 | B1 | 8/2001 | Sherman |
| 6,407,703 | B1* | 6/2002 | Minter .................. G01S 5/02 |
| | | | 342/450 |
| 6,417,799 | B1 | 7/2002 | Aubain et al. |
| 6,583,755 | B2* | 6/2003 | Martinerie ............ G01S 5/04 |
| | | | 342/357.48 |
| 7,369,810 | B2 | 5/2008 | Sichi et al. |
| 8,004,459 | B2 | 8/2011 | Ho et al. |
| 8,179,317 | B2* | 5/2012 | Seifer .................. G01S 7/021 |
| | | | 342/393 |
| 2002/0044614 | A1* | 4/2002 | Molnar ............... H04B 1/0003 |
| | | | 375/346 |
| 2006/0082501 | A1* | 4/2006 | Chiang .................. G01S 3/48 |
| | | | 342/442 |
| 2008/0252516 | A1 | 10/2008 | Ho et al. |
| 2012/0032854 | A1 | 2/2012 | Bull et al. |

OTHER PUBLICATIONS

Ho, K.C. et al. "Solution and Performance Analysis of Geolocation by TDOA." IEEE Trans. on AES, vol. 29, No. 4, Oct. 1993, pp. 1-12.*

Weiss. "Direct Geolocation of Wideband Emitters Based on Delay and Doppler." in IEEE Transactions on Signal Processing, vol. 59, No. 6, pp. 2513-2521, Jun. 2011.*

Becker, K. "An Efficient Method of Passive Emitter Location." IEEE Trans. Aerosp. Electron. Syst., vol. 28, No. 4, pp. 1091-1104, 1992.*

Severino et al. "Performances of a Doppler Based Direct Passive Location Technique." Tyrrhenian International Workshop on Digital Communications—Enhanced Surveillance of Aircraft and Vehicles—TIWDC/ESAV ,pp. 1-6. 2008.*

Groot et al. "Passive Emitter Location with Doppler Frequency and Interferometric Measurements." Proceedings Digital Communications—Enhanced Surveillance of Aircraft and Vehicles (TIWDC/ESAV 2008), 1-6, (2008).*

Yu. "Airborne Passive Localization Method Based on Doppler-Phase Interference Measuring." www.intechopen.com. pp. 1-37. Mar. 21, 2012.*

Witzgall et al. "Single Platform Passive Doppler Geolocation with Unknown Emitter Frequency." Aerospace Conference, 2010 IEEE, Big Sky, MT, 2010, pp. 1-8.*

Ojennes, Dan. "Insight Geolocation: Past, Present +Future." SatMagazine Dec. 2010, pp. 72-75.*

Potter, Bob. "Tools to Deliver Interference-free HD Content." SatMagazine Apr. 2007, pp. 35-37.*

Chestnut, P.; Emitter Location Accuracy Using TDOA and Differential Doppler; IEEE Transactions on Aerospace and Electronic Systems; Mar. 1982; pp. 214-218; vol. AES-18, No. 2; IEEE.

Godara, L.; Applications of Antenna Arrays to Mobile Communications, Part I: Performance Improvement, Feasibility, and Systems Considerations; Proceedings of the IEEE; Jul. 1997; pp. 1031-1060; vol. 85, No. 7; IEEE.

Godara, L.; Applications of Antenna Arrays to Mobile Communications, Part II: Beam-Forming and Direction-of- Arrival Considerations; Proceedings of the IEEE; Aug. 1997; pp. 1195-1245; vol. 85, No. 8; IEEE.

Extended European Search Report of application No. 13182593; Jan. 31, 2014; 5 pages.

EPO Examination Report for related application 13182593.7 dated Aug. 4, 2016; 6 pp.

* cited by examiner

SINGLE SATELLITE GEOLOCATION SYSTEMS AND METHODS

CROSS-REFERENCE TO RELATED APPLICATIONS

This application is a continuation-in-part of U.S. application Ser. No. 13/647,093, filed Oct. 8, 2012, the disclosure of which is hereby incorporated by reference in its entirety.

BACKGROUND OF THE INVENTION

The field of the disclosure relates generally to geolocation, and more specifically, to methods and systems for locating an interferer using a satellite system.

Generally, interference geolocation techniques can be grouped into two categories. The first category includes time difference of arrival (TDOA) and/or frequency difference of arrival (FDOA) techniques that use multiple receivers (e.g., satellites). In such techniques, a TDOA signature is determined from two receivers, and an FDOA signature is determined from one of the two receivers and used to locate the interferer. The FDOA signature is created as a result of a Doppler shift between the receiver and the transmitter (i.e., the interferer). Consequently, if the interferer is stationary and the receiver is not moving, there is no FDOA signature created and such techniques do not work. In such scenarios, an additional TDOA signature can be obtained from a third receiver.

The second category of interference geolocation techniques uses array signal processing techniques, such as MUSIC or ESPRIT, to determine an interferer location. These techniques do not use any TDOA or FDOA information. Rather, in such techniques, an array correlation matrix is formed from which the direction-of-arrival information can be obtained. However, generally known array processing techniques require a relatively complex antenna array and associated signal processing components, especially when the number of elements in the array is large.

BRIEF DESCRIPTION

In one aspect, a method for locating an interferer is provided. The method includes determining, from one of a time difference of arrival (TDOA) signature and a frequency difference of arrival (FDOA) signature between a first signal received at a satellite at a first location and a second signal received at the same satellite at a second location, a first curve on which the interferer lies, determining, from direction of arrival information generated using signals received from the interferer at a plurality of elements of a linear array on the satellite, a second curve on which the interferer lies, and determining, based on an intersection between the first and second curves, the location of the interferer.

In another aspect, a system for locating an interferer is provided. The system includes a linear array onboard a satellite and including a plurality of elements configured to receive signals from the interferer, and a computing device communicatively coupled to the linear array. The computing device is configured to determine, from one of a time difference of arrival (TDOA) signature and a frequency difference of arrival (FDOA) signature between a first signal received at the satellite at a first location and a second signal received at the same satellite at a second location, a first curve on which the interferer lies, determine, from direction of arrival information generated from signals received from the interferer at the plurality of elements of the linear array, a second curve on which the interferer lies, and determine, based on an intersection between the first and second curves, the location of the interferer.

In yet another aspect, a computing device for determining the location of an interferer is provided. The computing device is configured to determine, from one of a time difference of arrival (TDOA) signature and a frequency difference of arrival (FDOA) signature between a first signal received at a satellite at a first location and a second signal received at the same satellite at a second location, a first curve on which the interferer lies, determine, from direction of arrival information generated using signals received from the interferer at a plurality of elements of a linear array on the satellite, a second curve on which the interferer lies, and determine, based on an intersection between the first and second curves, the location of the interferer.

The features, functions, and advantages that have been discussed can be achieved independently in various embodiments or may be combined in yet other embodiments, further details of which can be seen with reference to the following description and drawings.

DETAILED DESCRIPTION

The systems and methods described herein enable an interferer to be located. A first curve is generated using one of a time difference of arrival signature and a frequency difference of arrival signature between two signals received by the same satellite. A second curve is generated using direction of arrival information generated from a linear array on the satellite. The location of the interferer is determined to be the intersection between the first and second curves.

Exemplary technical effects of the methods and systems described herein include at least one of (a) determining, from one of a time difference of arrival (TDOA) signature and a frequency difference of arrival (FDOA) signature between a first signal received at a satellite at a first location and a second signal received at the same satellite at a second location, a first curve on which the interferer lies; (b) determining, from direction of arrival information generated using signals received from the interferer at a plurality of elements of a linear array on the satellite, a second curve on which the interferer lies; and (c) determining, based on at an intersection between the first and second curves, the location of the interferer.

Figure 1:
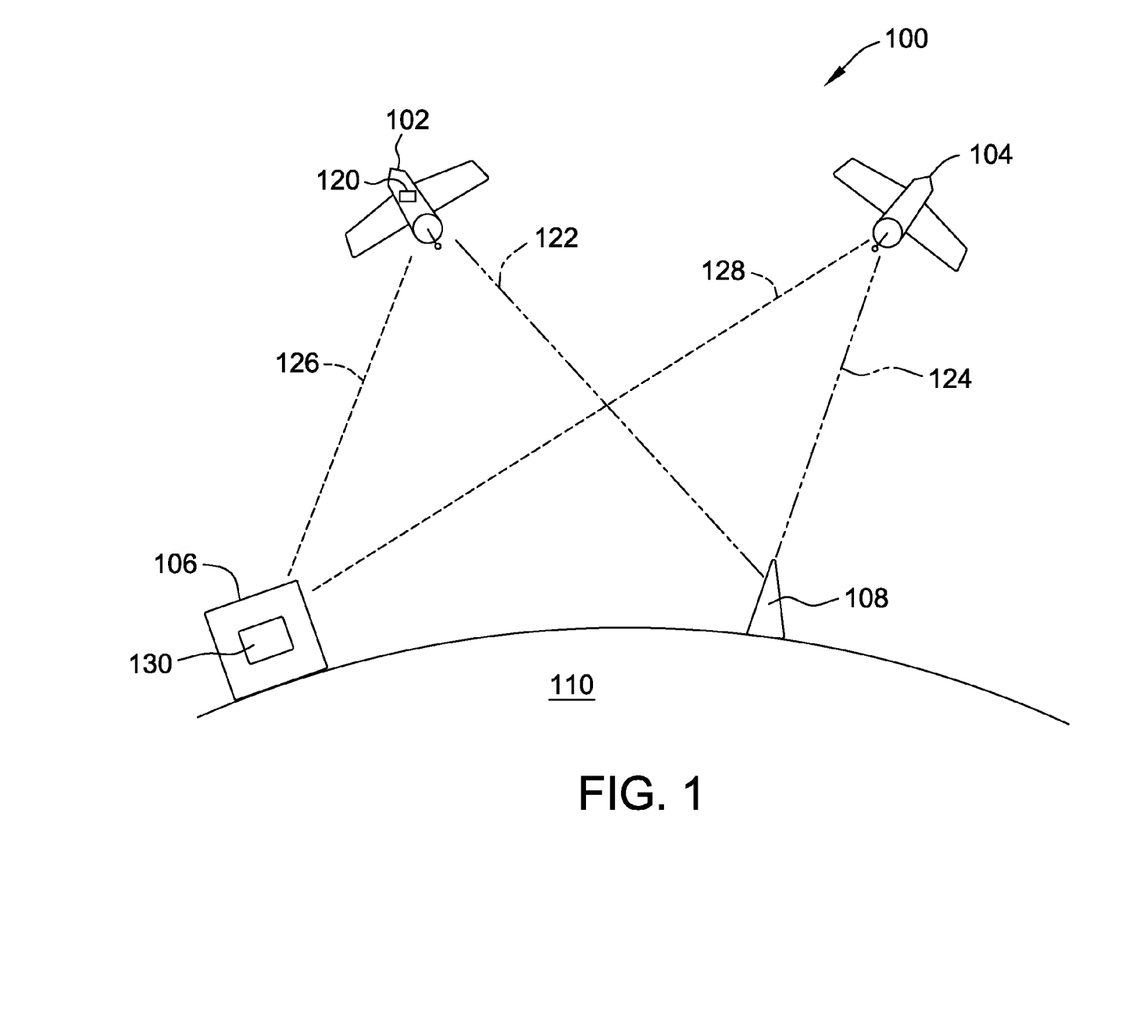
FIG. 1 is a schematic diagram of an exemplary geolocation system.

FIG. 1 is a schematic diagram of an exemplary geolocation system 100. In the exemplary embodiment, geolocation system 100 includes a first satellite 102, a second satellite 104, and a ground station 106. First and second satellites 102 and 104, respectively, are coupled in wireless communication with ground station 106 for determining a location of an interferer 108 on the Earth 110, as is described in more detail below. As used herein, an "interferer" may refer to a source of interference, and/or any other object that may be located using geolocation system 100.

In the exemplary embodiment, first and second satellites 102 and 104, respectively, are geostationary satellites. That is, satellites 102 and 104 each have a circular geosynchronous orbit that is substantially directly above the Equator of the Earth 110. Alternatively, satellites 102 and 104 may be non-geostationary satellites, or be any other type of satellite that enables system 100 to function as described herein. Further, system 100 may include a single satellite, or any other number of satellites that enables system 100 to function as described herein.

First satellite 102 includes a linear antennae array 120, in the exemplary embodiment. Alternatively, first and second satellites 102 and 104 may each include linear arrays 120, or linear array 120 may be included on a third satellite (not shown) that is different than satellites 102 and 104. Linear array 120 facilitates enables a location of interferer 108 to be determined, as described in more detail below.

To locate interferer 108, first and second satellites 102 and 104, respectively, each receive a signal transmitted from interferer 108 along a respective first communication path 122 and a second communication path 124. First satellite 102 transmits the received signal to ground station 106 along a third communication path 126, and second satellite 104 transmits the received signal to ground station 106 along a fourth communication path 128. Signals from linear array 120, and signals from satellites 102 and 104 may be transmitted using either analog or digital transformations.

From the received signals, a computing device 130 at ground station 106 determines a time difference of arrival (TDOA) signature (or, alternatively, a frequency difference of arrival (FDOA) signature) for interferer 108. The TDOA signature represents the amount of time elapsed between first satellite 102 receiving the signal from interferer 108 and second satellite 104 receiving the signal from interferer 108. The FDOA signature represents the frequency difference between the two received signals.

Figure 2A:
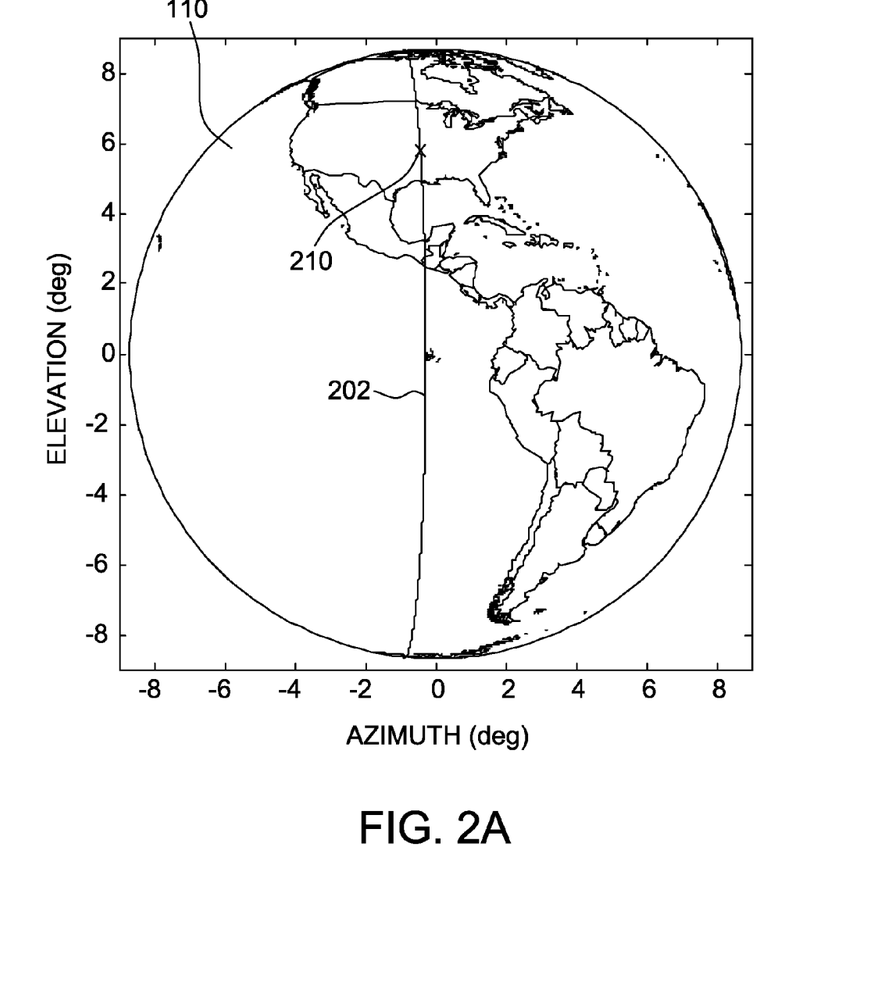
FIGS. 2A and 2B are schematic diagrams illustrating an exemplary method of locating an interferer using the system shown in FIG. 1.
Figure 2B:
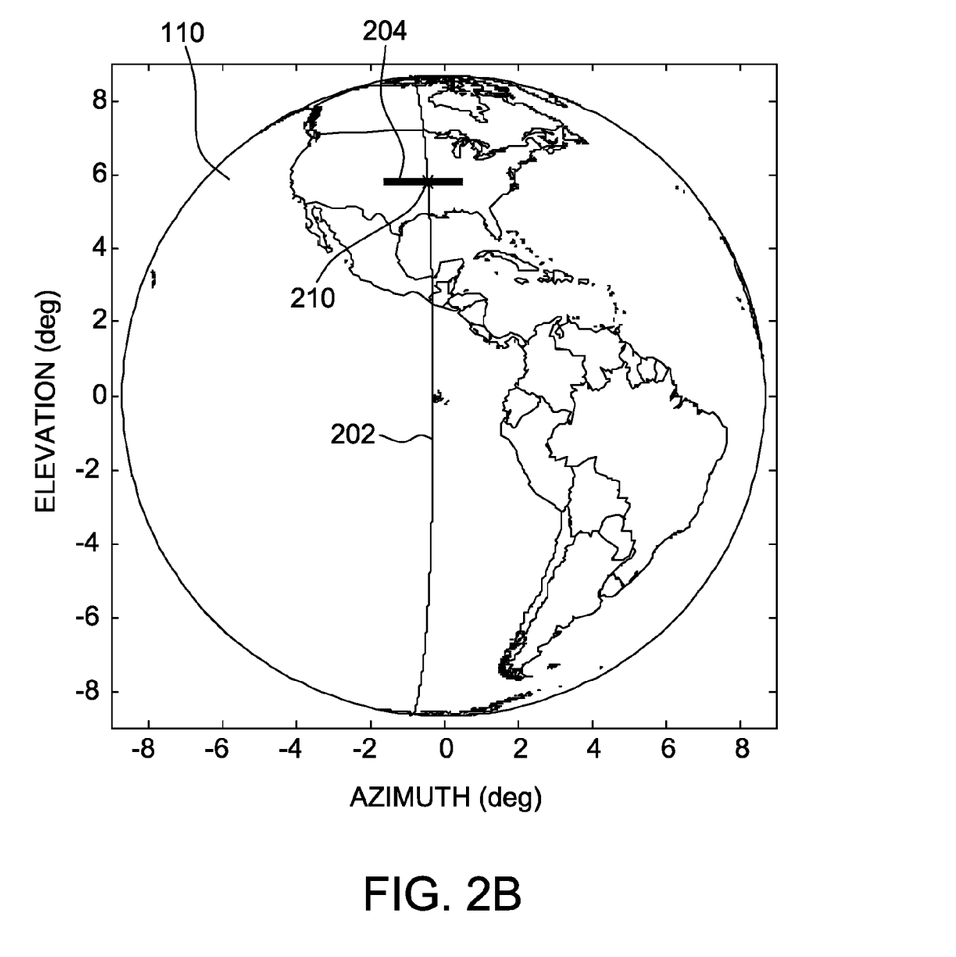

FIGS. 2A and 2B are schematic diagrams illustrating an exemplary method of locating an interferer, such as interferer 108, using a geolocation system, such as geolocation system 100 (both shown in FIG. 1). From the TDOA signature generated, as shown in FIG. 2A, a first curve 202 on the surface of the Earth 110 can be determined, on which the interferer 108 must lie. That is, given the TDOA signature between respective first and second satellites 102 and 104, computing device 130 restricts the possible locations of interferer 108 to lying on first curve 202. In the exemplary embodiment, first and second satellites 102 and 104 are geostationary satellites, and first curve is a line of longitude that identifies the East-West position of interferer 108.

To determine the location 210 of interferer 108 along first curve 202, a second curve 204 can be determined, as shown in FIG. 2B, and as is described in more detail below. The location 210 of interferer 108 is then determined to be at the intersection between curves 202 and 204.

Figure 3:
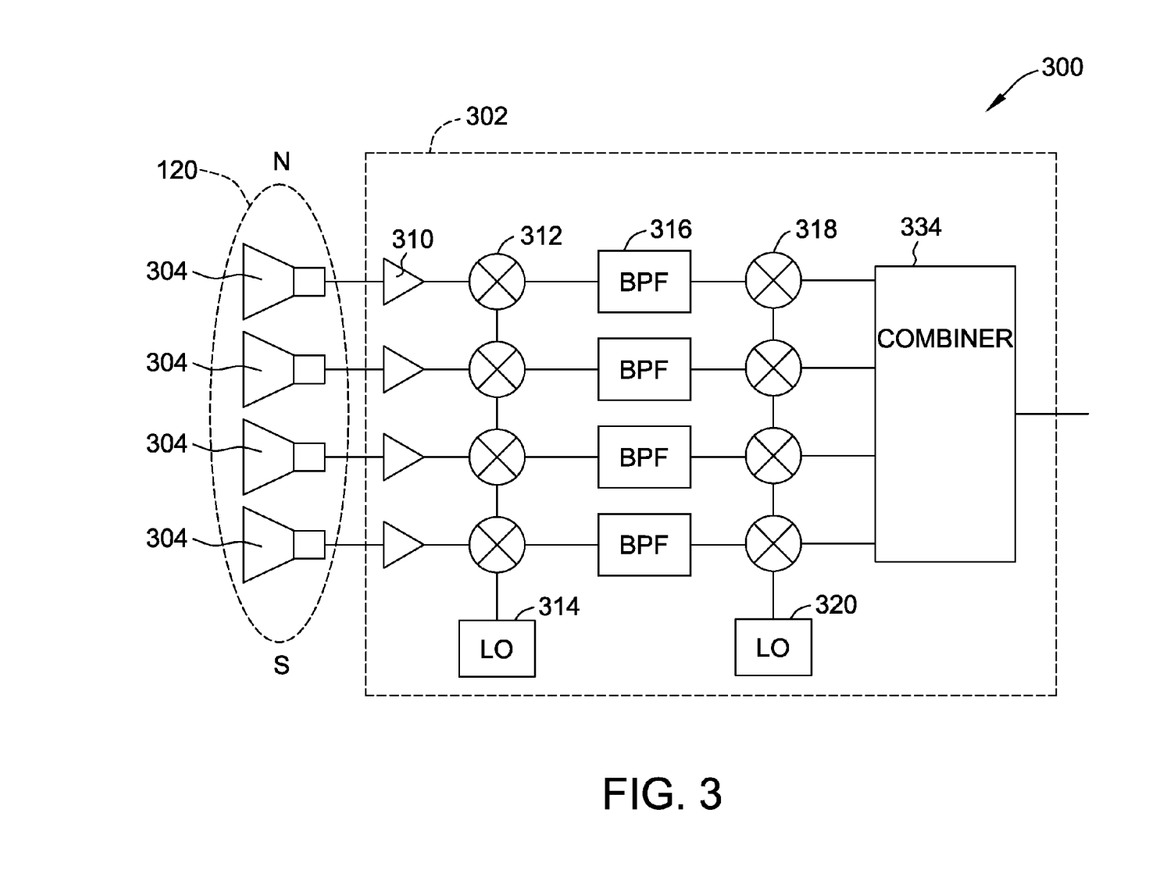
FIG. 3 is a schematic diagram of an exemplary linear array system that may be used with the geolocation system shown in FIG. 1.

FIG. 3 is a schematic diagram of an exemplary linear array system 300 that may be used with geolocation system 100 (shown in FIG. 1). Linear array system 300 includes linear array 120 and a plurality of signal processing components 302. In the exemplary embodiment, linear array 120 is located on first satellite 102, while signal processing components 302 are at ground station 106 (shown in FIG. 1). Alternatively, signal processing components 302 may also be on first satellite 102.

In the exemplary embodiment, linear array 120 includes four elements 304 that each receive signals from interferer 108. Alternatively, linear array 120 may include any number of elements 304 that enables system 100 to function as described herein. In general, the more elements 304 included in array, the more accurately the location 210 of interferer 108 can be determined. Signals from interferer 108 received at linear array 120 are used to determine second curve 204, as described in more detail below.

Elements 304 in linear array 120, in the exemplary embodiment, are aligned from North to South. Alternatively, elements 304 may be oriented in any configuration that enables linear array 120 to function as described herein. Signals received by elements 304 are transmitted to ground station 106 and processed by signal processing components 302. Specifically, in the exemplary embodiment, each signal received by each element 304 is amplified with an amplifier 310, mixed at a first mixer 312 with a signal from a first local oscillator 314, transmitted through a bandpass filter 316, and mixed at a second mixer 318 with a signal from a second local oscillator 320. Accordingly, signals from elements 304 undergo narrow band filtering during signal processing and thus reduce a required downlink bandwidth. The processed signals are input into a combiner 334 that determines direction of arrival information. Alternatively, signals from elements 304 may be processed using any suitable signal processing methods that enable system 100 to function as described herein.

Combiner 334 uses an array correlation matrix to determine the direction of arrival information for interferer 108. Since elements 304 are arranged linearly, determining the direction of arrival information is relatively simple as compared to using a two-dimensional array. From the direction of arrival information, the second curve 204, on the surface of the Earth 110, can be determined on which interferer 108 must lie. Specifically, when elements 304 are aligned from North to South (as in the exemplary embodiment), combiner 334 determines an East-West line (i.e., a line of latitude) that specifies the North-South position of interferer 108.

Referring again to FIG. 2B, as interferer 108 lies on the first curve 202 generated using the TDOA signature between first and second satellites 102 and 104, and interferer 108 further lies on second curve 204 generated using the direction of arrival information from elements 304 of linear array 120, the location 210 of interferer 108 is at the intersection between first curve 202 and second curve 204.

Figure 4:
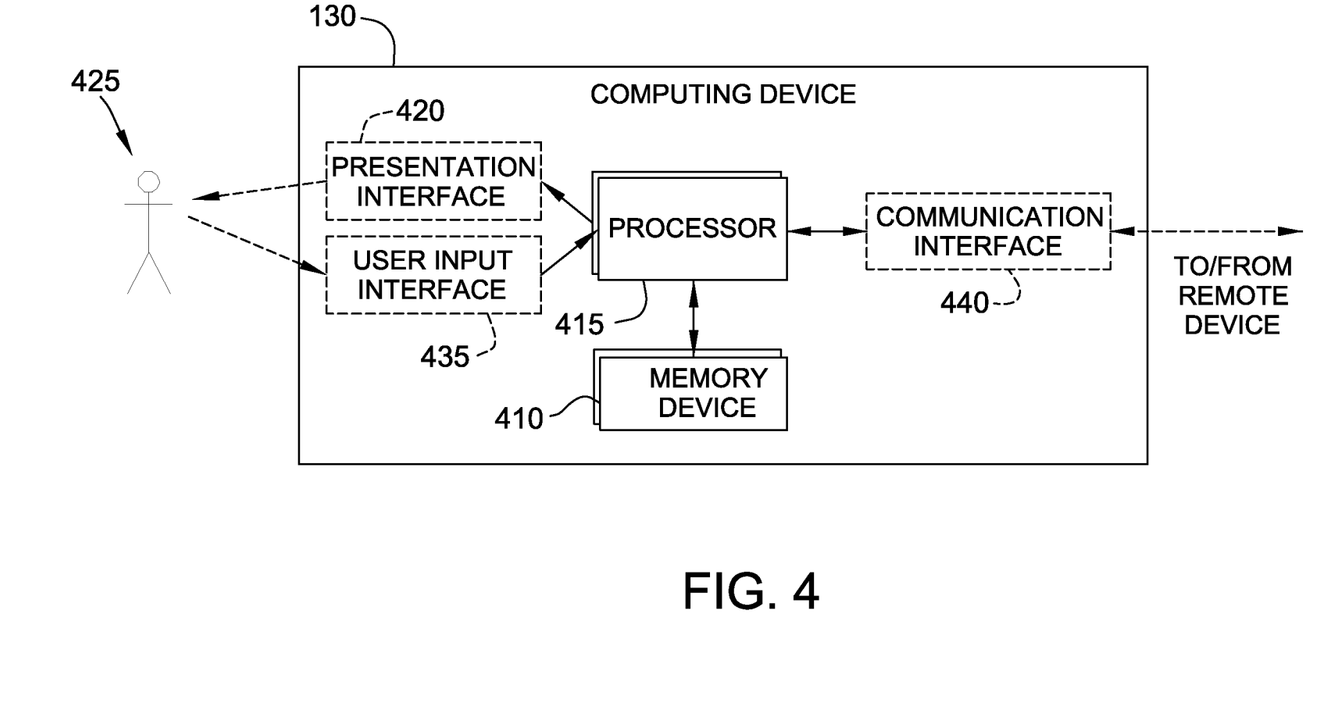
FIG. 4 is a block diagram of an exemplary computing device that may be used with the geolocation system shown in FIG. 1.

FIG. 4 is a block diagram of an exemplary computing device 130 that may be used with geolocation system 100 (shown in FIG. 1) to determine the location 210 of interferer 108. Computing device 130 includes at least one memory device 410 and a processor 415 that is coupled to memory device 410 for executing instructions. In some embodiments, executable instructions are stored in memory device 410. In the exemplary embodiment, computing device 130 performs one or more operations described herein by programming processor 415. For example, processor 415 may be programmed by encoding an operation as one or more executable instructions and by providing the executable instructions in memory device 410.

Processor 415 may include one or more processing units (e.g., in a multi-core configuration). Further, processor 415 may be implemented using one or more heterogeneous processor systems in which a main processor is present with secondary processors on a single chip. As another illustrative example, processor 415 may be a symmetric multiprocessor system containing multiple processors of the same type. Further, processor 415 may be implemented using any suitable programmable circuit including one or more systems and microcontrollers, microprocessors, reduced instruction set circuits (RISC), application specific integrated circuits (ASIC), programmable logic circuits, field programmable gate arrays (FPGA), and any other circuit capable of executing the functions described herein.

In the exemplary embodiment, processor 415 determines the location 210 of interferer 108, as described herein. That is, processor 415 determines first curve 202 based on the TDOA signature between first and second satellites 102 and 104, determines second curve 204 based on the direction of arrival information from elements 304 of linear array, and determines the location 210 of interferer 108 as the intersection of first curve 202 and second curve 204. Further, in at least some embodiments, processor 415 performs the above-described signal processing for linear array 120.

In the exemplary embodiment, memory device 410 is one or more devices that enable information such as executable instructions and/or other data to be stored and retrieved. Memory device 410 may include one or more computer readable media, such as, without limitation, dynamic random access memory (DRAM), static random access memory (SRAM), a solid state disk, and/or a hard disk. Memory device 410 may be configured to store, without limitation, application source code, application object code, source code portions of interest, object code portions of interest, configuration data, execution events and/or any other type of data.

In some embodiments, computing device 130 includes a presentation interface 420 that is coupled to processor 415. Presentation interface 420 presents information, such as application source code and/or execution events, to a user 425. For example, presentation interface 420 may include a display adapter (not shown) that may be coupled to a display device, such as a cathode ray tube (CRT), a liquid crystal display (LCD), an organic LED (OLED) display, and/or an "electronic ink" display. In some embodiments, presentation interface 420 includes one or more display devices. In the exemplary embodiment, presentation interface 420 displays the location 210 of interferer 108. The location 210 may be displayed on presentation interface 420 as a pair of latitude and longitude coordinates, as a point on a map (such as shown in FIGS. 5A and 5B), and/or in any format that enables user 425 to observe the location 210 of interferer 108.

In the exemplary embodiment, computing device 130 includes a user input interface 435. In the exemplary embodiment, user input interface 435 is coupled to processor 415 and receives input from user 425. User input interface 435 may include, for example, a keyboard, a pointing device, a mouse, a stylus, a touch sensitive panel (e.g., a touch pad or a touch screen), a gyroscope, an accelerometer, a position detector, and/or an audio user input interface. A single component, such as a touch screen, may function as both a display device of presentation interface 420 and user input interface 435.

In the exemplary embodiment, computing device 130 includes a communication interface 440 coupled to processor 415. Communication interface 440 communicates with one or more remote devices, such as first and second satellites 102 and 104. To communicate with remote devices, communication interface 440 may include, for example, a wired network adapter, a wireless network adapter, and/or a mobile telecommunications adapter.

Figure 5:
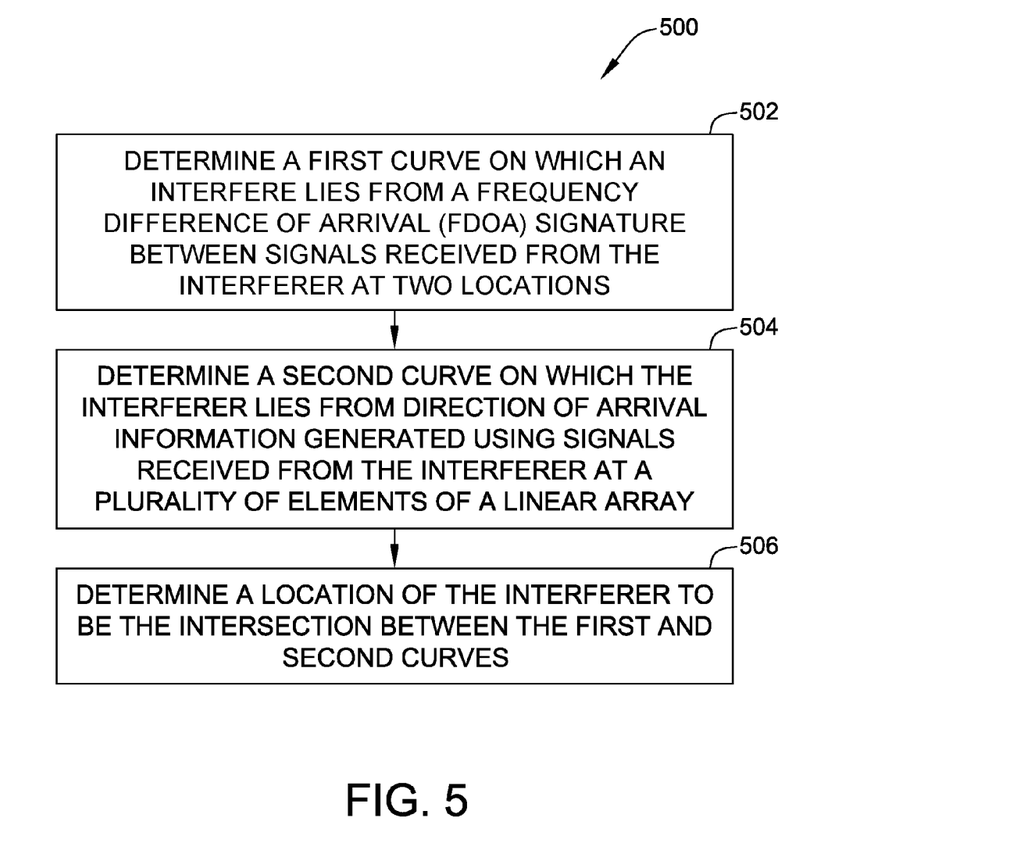
FIG. 5 is a flowchart of an exemplary method that may be implemented to locate an interferer.

FIG. 5 is a flowchart of an exemplary method 500 for use in locating an interferer, such as interferer 108 (shown in FIG. 1). A first curve, such as first curve 202 (shown in FIGS. 2A and 2B) is determined 502 from a FDOA signature from a single satellite, such as first satellite 102 (shown in FIG. 1), at two locations. A second curve, such as second curve 204 (shown in FIG. 2B) is determined 504 from a direction of arrival information from a linear array, such as linear array 120 (shown in FIG. 1), on one of the satellites. Since the interferer lies on the first curve and lies on the second curve, the location of the interferer is then determined 506 to be an intersection between the first and second curves.

The location of the interferer may be determined using a single satellite, such as first satellite 102 (shown in FIG. 1). More specifically, if the single satellite is moving (i.e., not geostationary), the TDOA signature or FDOA signature for determining 502 a first curve, such as first curve 202 (shown in FIGS. 2A and 2B), can be generated by collecting signal information at the single satellite at two different locations. A second curve, such as second curve 204 (shown in FIG. 2B), can be generated using a linear array on the single satellite, such as linear array 120 (shown in FIG. 1).

Figure 6:
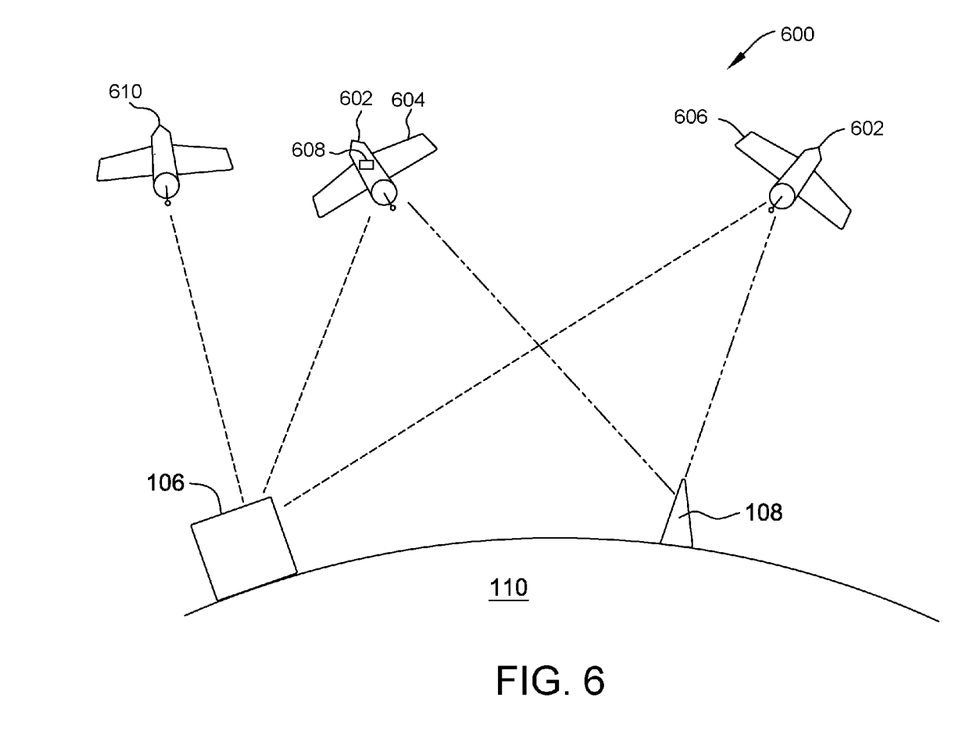
FIG. 6 is a schematic diagram of an exemplary geolocation system using a single satellite.

FIG. 6 is a schematic diagram of an exemplary geolocation system 600 using a single satellite 602. Single satellite 602 may be similar to first satellite 102 (shown in FIG. 1). System 600 includes single satellite 602 at a first position 604 and at a second position 606. Single satellite 602 includes a linear antennae array 608. Single satellite 602 receives signals through linear antennae array 608 from interferer 108 at first position 604 and second position 606. System 600 also includes a victim satellite 610.

The single satellite includes a global positioning system (GPS) receiver (not shown) in the alternative embodiment. The GPS receiver enables a position of the single satellite using ephemeris information to be detected.

To improve the accuracy of the first curve, a victim satellite, such as second satellite 104, may be utilized in addition to the single satellite. More specifically, the victim satellite captures a background, or baseline signal that represents background noise that is extraneous to signals generated by the interferer. A ground station, such as ground station 106, receives the baseline signal and adjusts the TDOA signature or FDOA accordingly. For example, to improve the accuracy of the TDOA or FDOA signature, and consequently the accuracy of the first curve, the baseline signal may be subtracted from the signal information received from the single satellite.

When generating the second curve, carrier-under-carrier processing substantially similar to that discussed above in reference to FIG. 3 is performed for each element of the linear array on the single satellite. That is, processing is performed prior to using a combiner, such as combiner 334, to combine the measurements from each element. The carrier-under-carrier processing facilitates eliminating noise from the measurements and improving the accuracy of the second curve.

To facilitate locating the interferer, the linear array on the single satellite is oriented substantially orthogonal to a velocity vector of the single satellite. For example, if the motion of the single satellite is primarily in the East-West direction, a linear array aligned along the North-South direction provides the complementary information. Conversely, if the motion of the single satellite is primarily in the North-South direction, a linear array aligned along the East-West direction provides the complementary information. Since the interferer lies on the first curve and lies on the second curve, similar to above, the location of the interferer is then determined to be an intersection between the first and second curves.

More specifically, to determine the location of the interferer, in the alternative embodiment, a data fusion algorithm combines the TDOA signature or FDOA signature with the direction of arrival information from the linear array. The data fusion algorithm uses the measured data to form an eigenvalue equation, and the solution of the eigenvalue equation represents the determined location of the interferer. The eigenvalue equation is of a standard form and yields itself to a relatively efficient solution. Consequently, a robust estimate for the actual location of the interferer may be obtained without resorting to complex search algorithms and/or iterative techniques. The data fusion algorithm may be performed by a processing device, such as processor 415 (shown in FIG. 4). The data fusion algorithm may also be used to determine the location of the interferer in systems and methods that include two satellites.

The embodiments described herein enable an interferer to be located accurately. A first curve is generated using one of a time difference of arrival signature and a frequency difference of arrival signature between two signals received by the same satellite. A second curve is generated using direction of arrival information generated from a linear array on the satellite. The location of the interferer is determined to be the intersection between the first and second curves.

As compared to at least some known geolocation systems, the systems and methods described herein are capable of locating an interferer using a relatively simpler configuration. While at least some known geolocation systems use a two-dimensional array to determine direction of arrival information, the systems and methods described herein utilize a single linear array. For example, in one embodiment, a four element linear array in the systems and methods described herein provides roughly the same accuracy as a 4×4 array in at least some known geolocation systems, resulting in a 75% reduction in complexity. Further, the systems and methods described herein are capable of locating an interferer using a single satellite.

The embodiments described herein may utilize executable instructions embodied in a non-transitory computer readable medium, including, without limitation, a storage device or a memory area of a computing device. Such instructions, when executed by one or more processors, cause the processor(s) to perform at least a portion of the methods described herein. As used herein, a "storage device" is a tangible article, such as a hard drive, a solid state memory device, and/or an optical disk that is operable to store data.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose various embodiments, which include the best mode, to enable any person skilled in the art to practice those embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for locating an interferer, said method comprising:
    determining a first curve on which the interferer lies from a frequency difference of arrival (FDOA) signature between a first signal and a second signal received from the interferer at a single linear array onboard one satellite, wherein the linear array includes a plurality of linearly arranged elements configured to receive signals from the interferer, and wherein the first signal is received at a first location of the satellite and the second signal is received at a second location of the same satellite, wherein the first location and the second location are different locations of the satellite relative to the Earth;
    determining a second curve on which the interferer lies from direction of arrival information generated using the signals received from the interferer at the plurality of linearly arranged elements, wherein the plurality of linearly arranged elements are positioned substantially orthogonally to a velocity vector of the satellite;
    receiving, from a victim satellite different from the one satellite, a baseline signal representative of background noise extraneous to signals generated by the interferer; and
    subtracting the baseline signal from the first and second signals to improve an accuracy of the FDOA signature and the first curve; and
    determining, based on an intersection between the first and second curves, the location of the interferer.

2. A method in accordance with claim 1, wherein determining the second curve on which the interferer lies further comprises combining the signals received from the interferer at the plurality of linearly arranged elements to generate the direction of arrival information.

3. A method in accordance with claim 1, wherein determining the location of the interferer comprises:
    forming an eigenvalue equation from the direction of arrival information and the FDOA signature; and
    determining a solution to the eigenvalue equation, wherein the solution represents the location of the interferer.

4. A method in accordance with claim 1, further comprising determining a position of the satellite using a global positioning system receiver onboard the satellite.

5. A method in accordance with claim 1, wherein determining a first curve comprises determining, from an FDOA signature between a first signal received at a non-geostationary satellite at a first location and a second signal received at the same non-geostationary satellite at a second location, a first curve on which the interferer lies.

6. A system for locating an interferer, said system comprising:
    a single linear array onboard one satellite and comprising a plurality of linearly arranged elements configured to receive signals from the interferer, wherein said plurality of linearly arranged elements are positioned substantially orthogonally to a velocity vector of the satellite;
    a victim satellite different from the one satellite; and
    a computing device communicatively coupled to said linear array, said computing device configured to:
        determine, from a frequency difference of arrival (FDOA) signature between a first signal received at a first location of the satellite and a second signal received at a second location of the same satellite, a first curve on which the interferer lies, wherein the first location and the second location are different locations of the satellite relative to the Earth;

determine, from direction of arrival information generated from the signals received from the interferer at said plurality of linearly arranged elements, a second curve on which the interferer lies;

receive, from the victim satellite, a baseline signal representative of background noise extraneous to signals generated by the interferer;

subtract the baseline signal from the first and second signals to improve an accuracy of the FDOA signature and the first curve; and determine, based on an intersection between the first and second curves, the location of the interferer.

7. A system in accordance with claim 6, further comprising a global positioning system receiver onboard the satellite, said global positioning system receiver configured to determine a position of the satellite.

8. A system in accordance with claim 6, wherein said plurality of linearly arranged elements are aligned from North to South.

9. A system in accordance with claim 6, wherein to determine the second curve, said computing device is configured to combine the signals received from the interferer at said plurality of linearly arranged elements to generate the direction of arrival information.

10. A system in accordance with claim 6, wherein to determine the location of the interferer, said computing device is configured to:

form an eigenvalue equation from the direction of arrival information and the FDOA signature; and determine a solution to the eigenvalue equation, wherein the solution represents the location of the interferer.

11. A system in accordance with claim 9, wherein to combine the processed signals to generate the direction of arrival information, said computing device is further configured to use an array correlation matrix.

12. A system in accordance with claim 6 further comprising:

a plurality of amplifiers, each said amplifier communicatively coupled to each said element for receiving and amplifying the interferer signals from each said element;

a plurality of first mixers, each said first mixer communicatively coupled to each said amplifier and communicatively coupled to a first local oscillator, wherein an amplified signal from said each amplifier is mixed with a first oscillator signal from said first local oscillator to generate a first mixed signal;

a plurality of bandpass filters, each said bandpass filter communicatively coupled to each said first mixer for generating a filtered signal from the first mixed signal;

a plurality of second mixers, each said second mixer communicatively coupled to each said bandpass filter and communicatively coupled to a second local oscillator, wherein the filtered signal is mixed with a second oscillator signal from said second local oscillator to generate a second mixed signal; and a combiner communicatively coupled to said each second mixer and configured to receive the second mixed signal and determine the direction of arrival information.

* * * * *